United States Patent
Baker et al.

(10) Patent No.: US 9,065,801 B2
(45) Date of Patent: Jun. 23, 2015

(54) SYSTEM AND METHOD TO ENABLE EXTERNAL PROCESSING DEVICE RUNNING A CLOUD APPLICATION TO CONTROL A MAIL PROCESSING MACHINE

(75) Inventors: Walter J. Baker, Stratford, CT (US); Wesley A. Kirschner, Farmington, CT (US); George T. Monroe, Seymour, CT (US); Sambasivam Thillaikumaran, Southbury, CT (US)

(73) Assignee: Pitney Bowes Inc., Stamford, CT (US)

( * ) Notice: Subject to any disclaimer, the term of this patent is extended or adjusted under 35 U.S.C. 154(b) by 445 days.

(21) Appl. No.: 13/479,751

(22) Filed: May 24, 2012

(65) Prior Publication Data

US 2013/0318583 A1 Nov. 28, 2013

(51) Int. Cl.
*G06F 15/173* (2006.01)
*H04L 29/08* (2006.01)
*G07B 17/00* (2006.01)
*H04L 29/06* (2006.01)
*G06F 13/38* (2006.01)

(52) U.S. Cl.
CPC .......... *H04L 67/025* (2013.01); *G07B 17/0008* (2013.01); *G07B 2017/00145* (2013.01); *G06F 13/382* (2013.01); *G07B 17/00435* (2013.01); *G07B 2017/00048* (2013.01); *G07B 2017/00056* (2013.01); *G07B 2017/00112* (2013.01); *G07B 2017/00137* (2013.01); *G07B 2017/00161* (2013.01); *H04L 69/24* (2013.01)

(58) Field of Classification Search
CPC ............... H04L 67/025; G07B 17/008; G07B 2017/0056; G07B 2017/00112
USPC .......... 726/4, 5, 6, 7; 709/224, 226, 203, 246
See application file for complete search history.

(56) References Cited

U.S. PATENT DOCUMENTS

| | | |
|---|---|---|
| 5,625,694 A | 4/1997 | Lee |
| 5,781,438 A | 7/1998 | Lee |
| 5,987,441 A | 11/1999 | Lee |
| 6,061,671 A | 5/2000 | Baker |
| 6,064,993 A | 5/2000 | Ryan, Jr. |
| 6,081,795 A | 6/2000 | Ryan, Jr. |
| 6,085,181 A | 7/2000 | Gravell |
| 6,098,058 A | 8/2000 | Gravell |
| 6,151,590 A | 11/2000 | Cordery |
| 6,151,591 A | 11/2000 | Pierce |
| 6,157,919 A | 12/2000 | Cordery |

(Continued)

*Primary Examiner* — Brandon Hoffman
*Assistant Examiner* — Nega Woldemariam
(74) *Attorney, Agent, or Firm* — Brian A. Lemm; Charles R. Malandra, Jr.; Steven J. Shapiro

(57) ABSTRACT

A network connectivity device that when coupled to a mail processing machine enables a cloud application running on a personal computer or other device to interface with and control the mail processing machine without requiring any software to be installed on the personal computer other than a web browser. The network connectivity device plugs into a standard USB port on the mail processing machine to allow wired or wireless connectivity to a network. There is no software or other code required to run on the personal computer other than a standard web browser running a hosted web application. The network connectivity device allows the mail processing machine to be found and addressed by the hosted web application. This allows a user to control operations of the mail processing machine, as well as giving the mail processing machine network connectivity for outside world communication activities.

16 Claims, 9 Drawing Sheets

(56) References Cited

U.S. PATENT DOCUMENTS

| | | |
|---|---|---|
| 6,169,804 B1 | 1/2001 | Ryan, Jr. |
| 6,175,826 B1 | 1/2001 | Malandra, Jr. |
| 6,192,473 B1 | 2/2001 | Ryan, Jr. |
| 6,202,057 B1 | 3/2001 | Pierce |
| 6,260,144 B1 | 7/2001 | Pitchenik |
| 6,466,921 B1 | 10/2002 | Cordery |
| 6,470,327 B1 | 10/2002 | Carroll |
| 6,546,377 B1 | 4/2003 | Gravell |
| 6,865,557 B1 | 3/2005 | Cordery |
| 6,920,557 B2 | 7/2005 | Coffyy |
| 6,922,678 B2 | 7/2005 | Gravell |
| 7,203,666 B1 | 4/2007 | Gravell |
| 7,797,247 B2 | 9/2010 | Braun |
| 8,015,115 B2 | 9/2011 | Brennan |
| 2002/0087492 A1* | 7/2002 | Carroll et al. .................. 705/404 |
| 2009/0100178 A1* | 4/2009 | Gonzales et al. ............. 709/226 |
| 2011/0240736 A1* | 10/2011 | Miyachi et al. ............... 235/382 |

* cited by examiner

SYSTEM AND METHOD TO ENABLE EXTERNAL PROCESSING DEVICE RUNNING A CLOUD APPLICATION TO CONTROL A MAIL PROCESSING MACHINE

FIELD OF THE INVENTION

The invention disclosed herein relates generally to network connectivity of mail processing machines, and more particularly to a network connectivity device that when coupled to a mail processing machine will enable a cloud application running on an external processing device to interface with and control the mail processing machine.

BACKGROUND OF THE INVENTION

Mail processing machines often include different modules that automate the processes of producing mail pieces. A typical mail processing machine can include a one or more different modules or sub-systems each of which performs a different task on a mail piece. In larger machines, the mail piece is conveyed downstream utilizing a transport mechanism, such as rollers or a belt, to each of the modules. Such modules could include, for example, a singulating module, i.e., separating a stack of mail pieces such that the mail pieces are conveyed one at a time along the transport path, a moistening/sealing module, i.e., wetting and closing the glued flap of an envelope, a weighing module, and a metering/printing module, i.e., applying evidence of postage to the mail piece. In smaller machines, mail pieces may be fed one at a time by hand under a printing module to apply evidence of postage to the mail piece. The size of a mailing machine and exact configuration is, of course, particular to the needs of the user.

In some situations, it is desirous to allow a mailing machine to interface with an external processing device, such as, for example, a personal computer, tablet device, etc. Such an external processing device can provide the user with an enhanced user interface and allow the user to control certain operations of the mail processing machine as well as access other products or services that the mailing machine alone could not provide. In such situations, it is necessary for the external processing device to have specific software installed and running thereon, such as some type of proxy server software or driver software. Because of the different operating platforms and types of external processor devices, this would require different software for each different type of processor device. This greatly reduces the effectiveness of such systems.

SUMMARY OF THE INVENTION

The present invention provides a network connectivity device that when coupled to a mail processing machine enables a cloud application running on a personal computer or other device to interface with the mail processing machine without requiring any software to be installed on the personal computer other than a web browser. The network connectivity device plugs into a standard USB slave port on the mail processing machine to allow wired or wireless connectivity to a network, e.g., LAN or the Internet. The network connectivity device provides the capability to connect to the network in a static IP address environment and the capability to attach to a proxy server. There is no software or other code required to run on the personal computer other than a standard web browser running a hosted web application. The network connectivity device allows the mail processing machine to be found and addressed by the hosted web application. This allows a user to control operations of the mail processing machine, as well as giving the mail processing machine network connectivity for outside world communication activities, thereby giving the user a better user experience.

Therefore, it should now be apparent that the invention substantially achieves all the above aspects and advantages. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

DESCRIPTION OF THE DRAWINGS

The accompanying drawings illustrate presently preferred embodiments of the invention, and together with the general description given above and the detailed description given below, by way of example serve to explain the invention in more detail. As shown throughout the drawings, like reference numerals designate like or corresponding parts.

DETAILED DESCRIPTION OF THE PRESENT INVENTION

Figure 1:
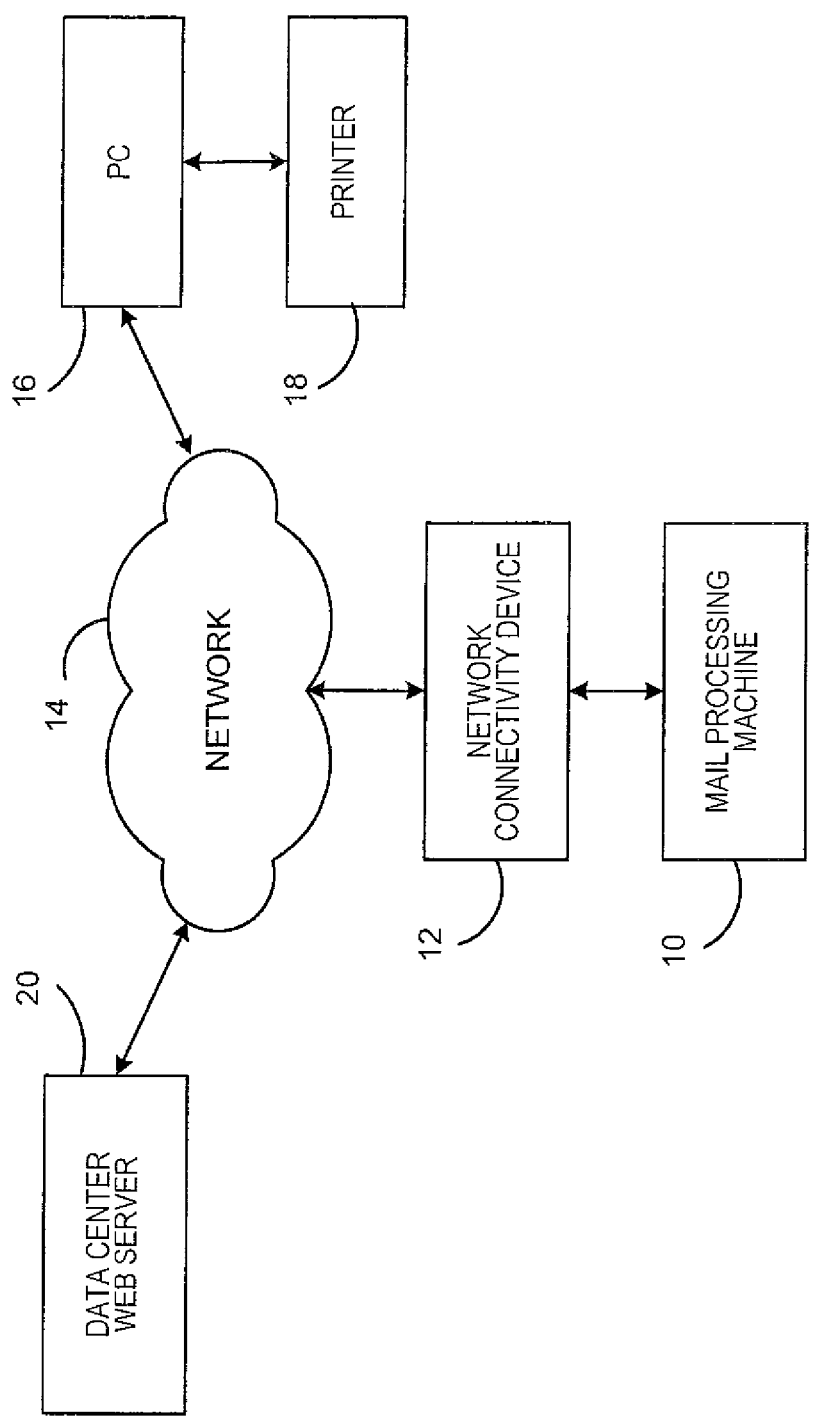
FIG. 1 illustrates in block diagram form a system according to an embodiment of the present invention.

In describing the present invention, reference is made to the drawings, wherein there is seen in FIG. 1 in block diagram form a system according to an embodiment of the present invention. A network connectivity device 12 according to the present invention is coupled to a mail processing machine 10 (may also be referred to as a postage meter) utilizing a USB slave port on the mail processing machine 10. The mail processing machine 10 can be any type of mail processing machine, such as, for example, the mailstation2™ Digital Mailing System from Pitney Bowes Inc.

The network connectivity device 12 communicates with a network 14 via a communication interface (described below). Such communication interface can either be a wired or wireless interface based on the availability and selection made by a user when setting up the device 12. The network 14 can be any type of communication network, e.g., LAN, WAN, or the like, or any combination thereof. An external processing device, such as personal computer 16, can connect to the network 14 to control the mail processing machine 10 as described further below. Personal computer 16 can be any type of conventional processing device that has the capability to connect to a network and run a standard web browser, including, for example, tablets or other hand-held mobile devices. A printer 18, such as for example an ink-jet printer or the like, can be coupled to PC 16. Web pages accessed by the PC 16 can be maintained by a data center web server 20 that is also coupled to the network 14. Web server 20 includes one or more processing units (not shown).

Figure 2:
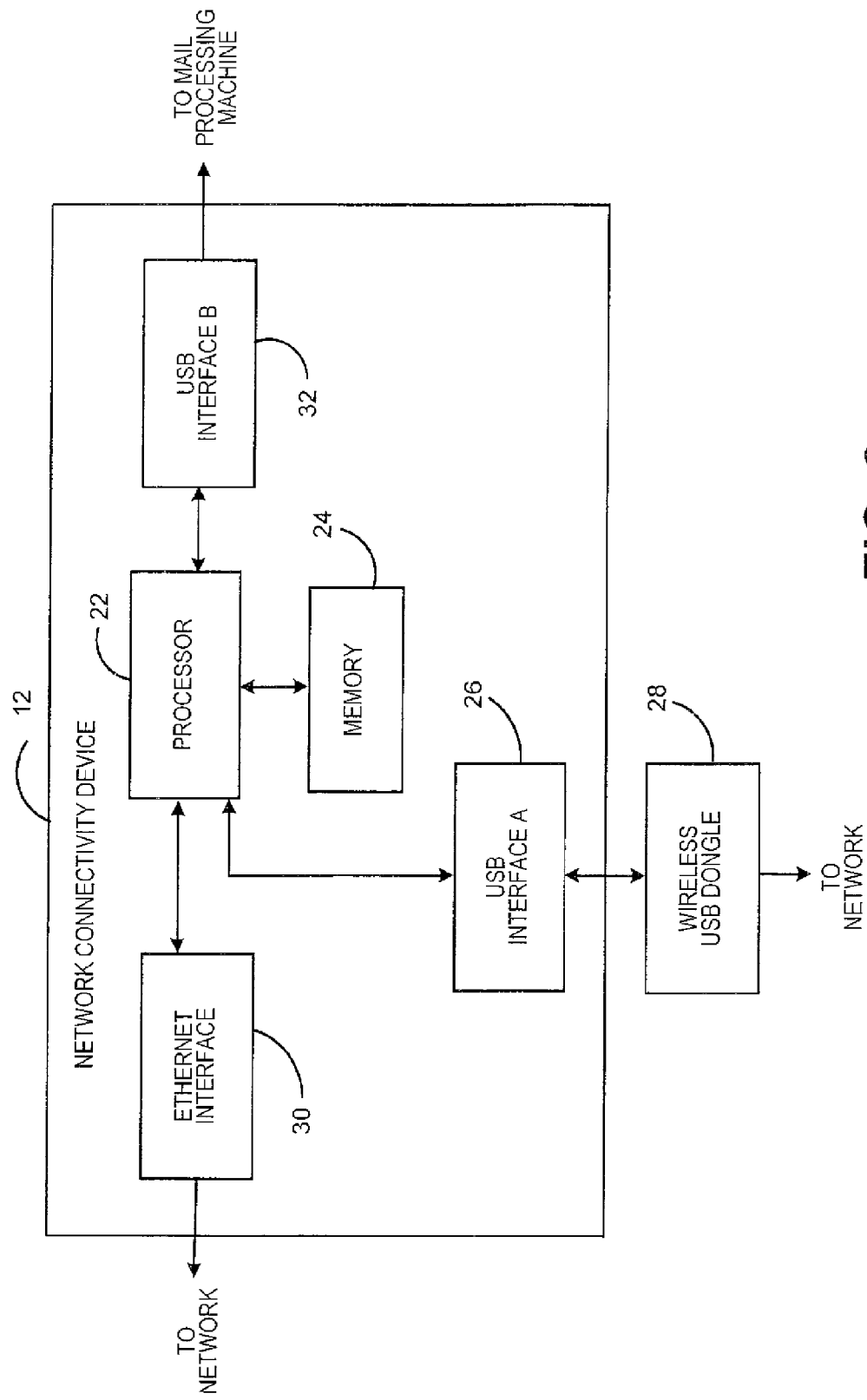
FIG. 2 illustrates in block diagram form a network connectivity device according to an embodiment of the present invention.

FIG. 2 illustrates in block diagram form the network connectivity device 12. Device 12 includes a processing device 22, which may include a microprocessor, a microcontroller, or any other suitable processor, which is operatively coupled to a suitable memory 24 for storing routines to be executed by the processing device 22. Memory device 24 can include RAM, Flash or any other suitable type of memory. A USB Interface A 26 provides a wireless connection to the network 14, such as, for example, utilizing a wireless USB dongle 28 or internal components to allow the device 12 to wirelessly connect to the network 14. An Ethernet interface 30 is also provided to allow a wired connection to the network 14. A second USB Interface B 32 provides a connection to the mail processing machine 10.

Figure 3:
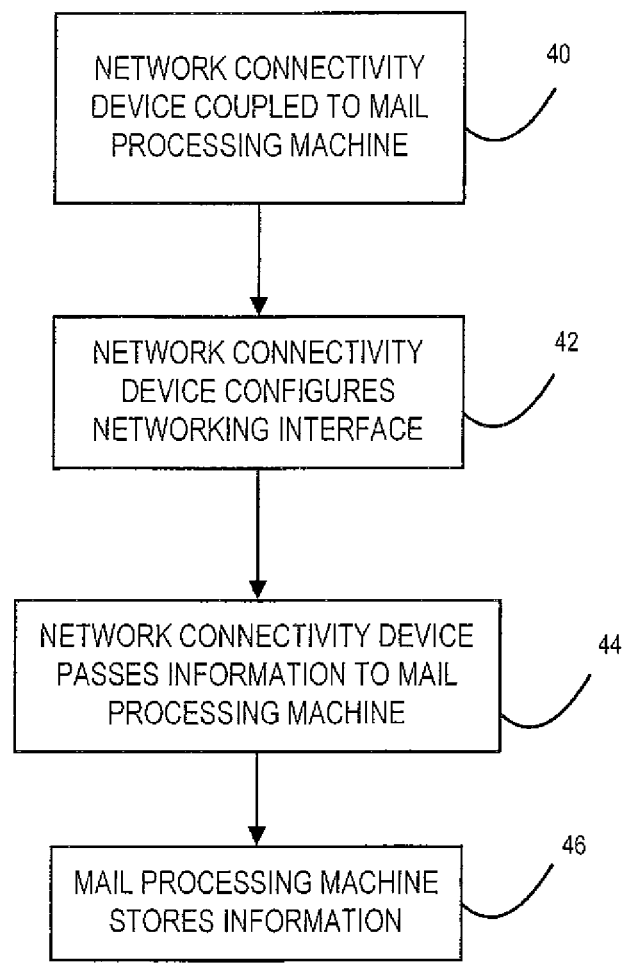
FIG. 3 illustrates in flow diagram form the configuring of the network connectivity device to enable a user operating a PC to interface with the mail processing machine according to an embodiment of the present invention.

FIG. 3 illustrates in flow diagram form the steps for configuring the network connectivity device 12 to enable a user operating the PC 16 to control the mail processing machine 10. In step 40, the network connectivity device 12 is coupled to the mail processing machine 10 via the USB interface B 32. The network connectivity device 12 operates as the USB host. In step 42, the network connectivity device 12 configures its networking interface (either the USB Interface A 26 and dongle 28 or ethernet interface 30, depending on whether it is a wireless or wired connection) using standard networking configuration protocols with required network parameters that are comprised of IP Address, Net Mask, Subnet and Domain Name Server (DNS) Lookup and if the connection is a wireless connection, a wireless identification and passkey. The parameters of IP Address, Net Mask and Subnet can be auto assigned using Dynamic Host Configuration Protocol (DHCP) or from what a user has previously configured. The DNS information can be obtained from the customer's network, a router or manually configured. In the event that the user requires a proxy server for devices to connect the network 14, the user can also specify proxy information including the HTTP/HTTPS Addresses and Port numbers, Proxy Exclusion List and Proxy Username and Password. In step 44, the network configuration information (and proxy information, if required) are passed from the network connectivity device 12 to the mail processing machine 10 via the USB interface B 32 connection. Upon receiving this information the mail processing machine 10 stores it locally in a memory device. This information is then used by the mail processing machine's 10 network stack to form Ethernet packets when the mail processing machine 10 needs to communicate to the outside world using the network connectivity device 12. The mail processing machine 10 has a Network Stack that contains the logic required to form various types of network packets including Address Resolution Protocol (ARP), Domain Name System (DNS) and Transmission Control Protocol/Internet Protocol (TCP/IP). Once created, these packets are passed to the network connectivity device 12 for transmission over the network 14. The network stack of the mail processing machine 10 also has the ability to translate these various packet types when received from the network connectivity device 12.

Figure 4:
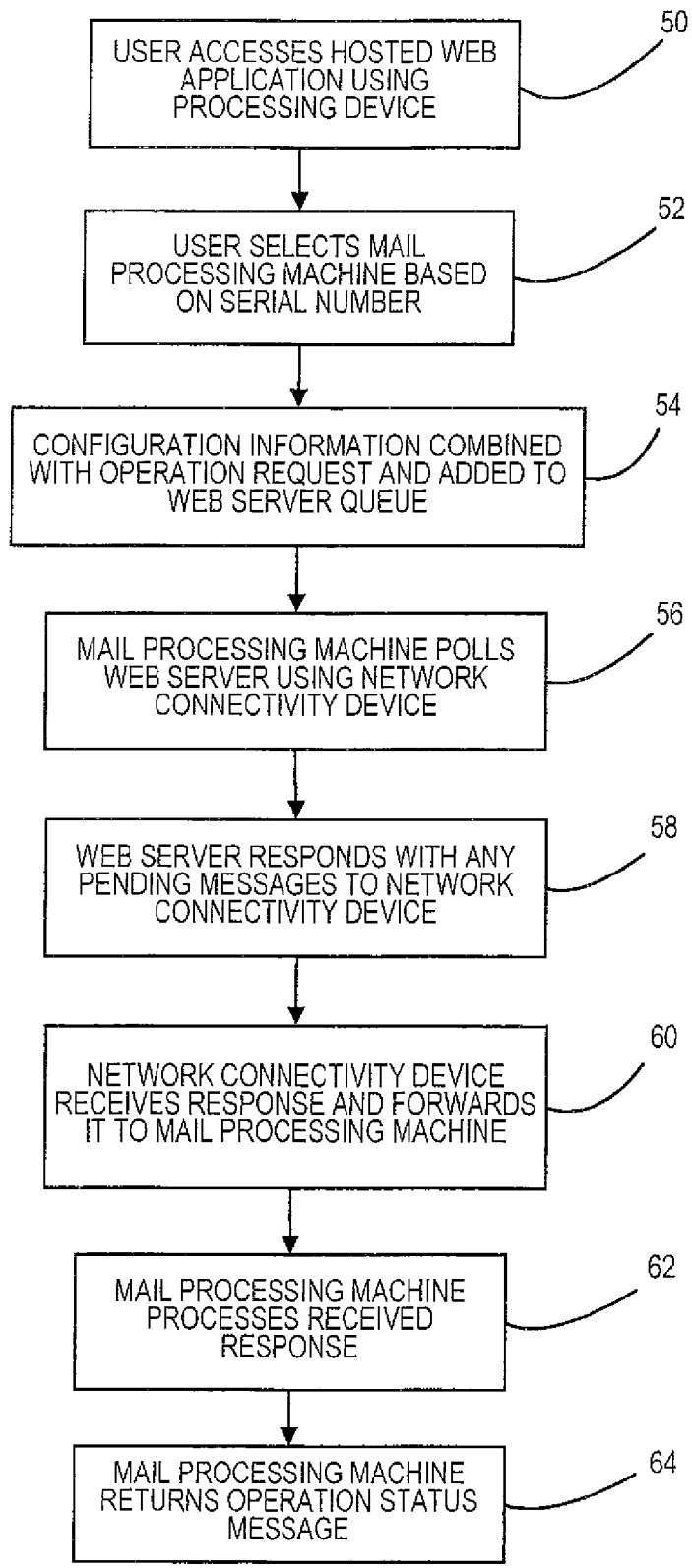
FIG. 4 illustrates in flow diagram form the operation of the system that allows a user operating a PC to interface with the mail processing machine according to an embodiment of the present invention.
Figure 5:
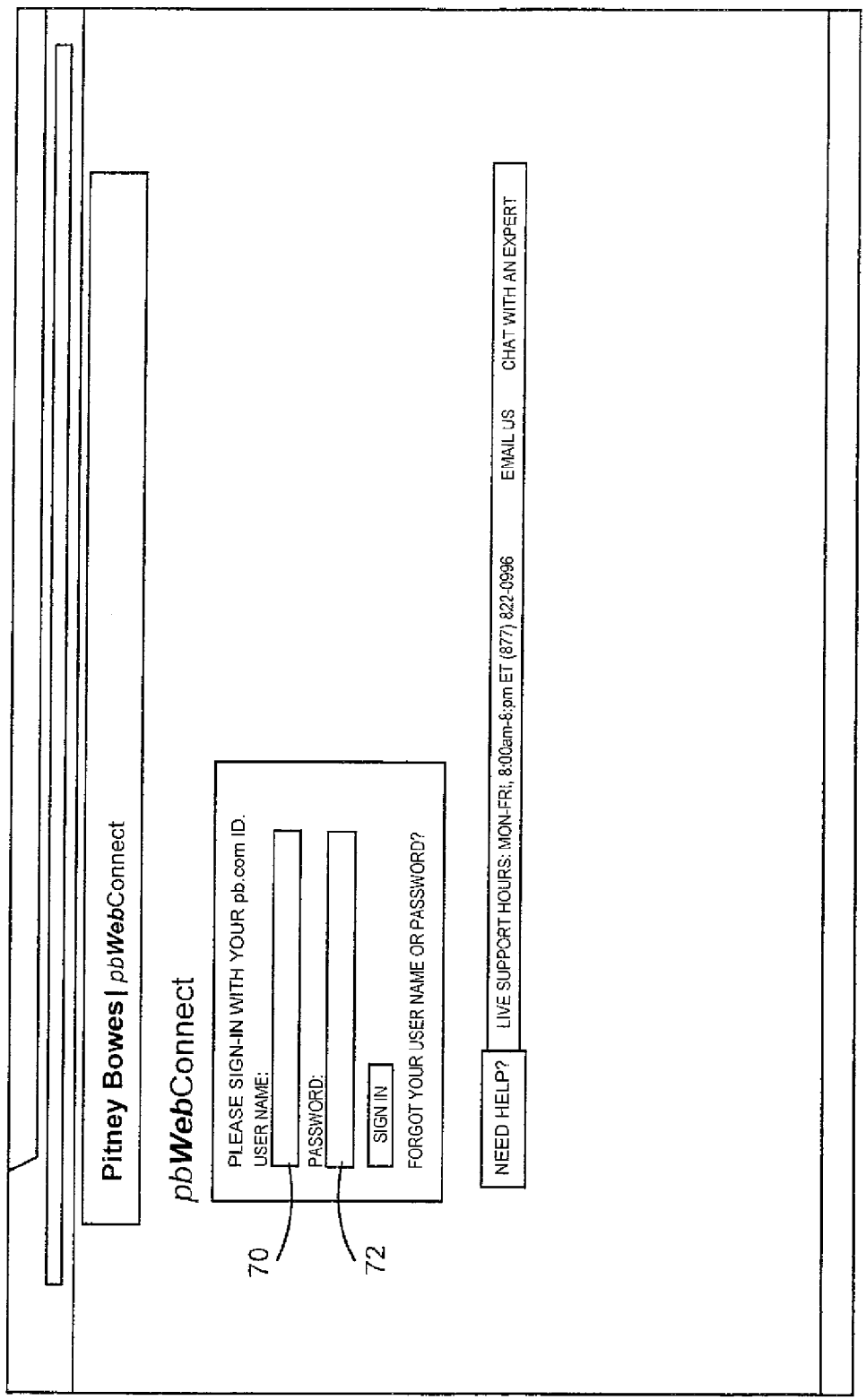
FIGS. 5-9 illustrate examples of screens displayed to a user according to an embodiment of the present invention.
Figure 6:
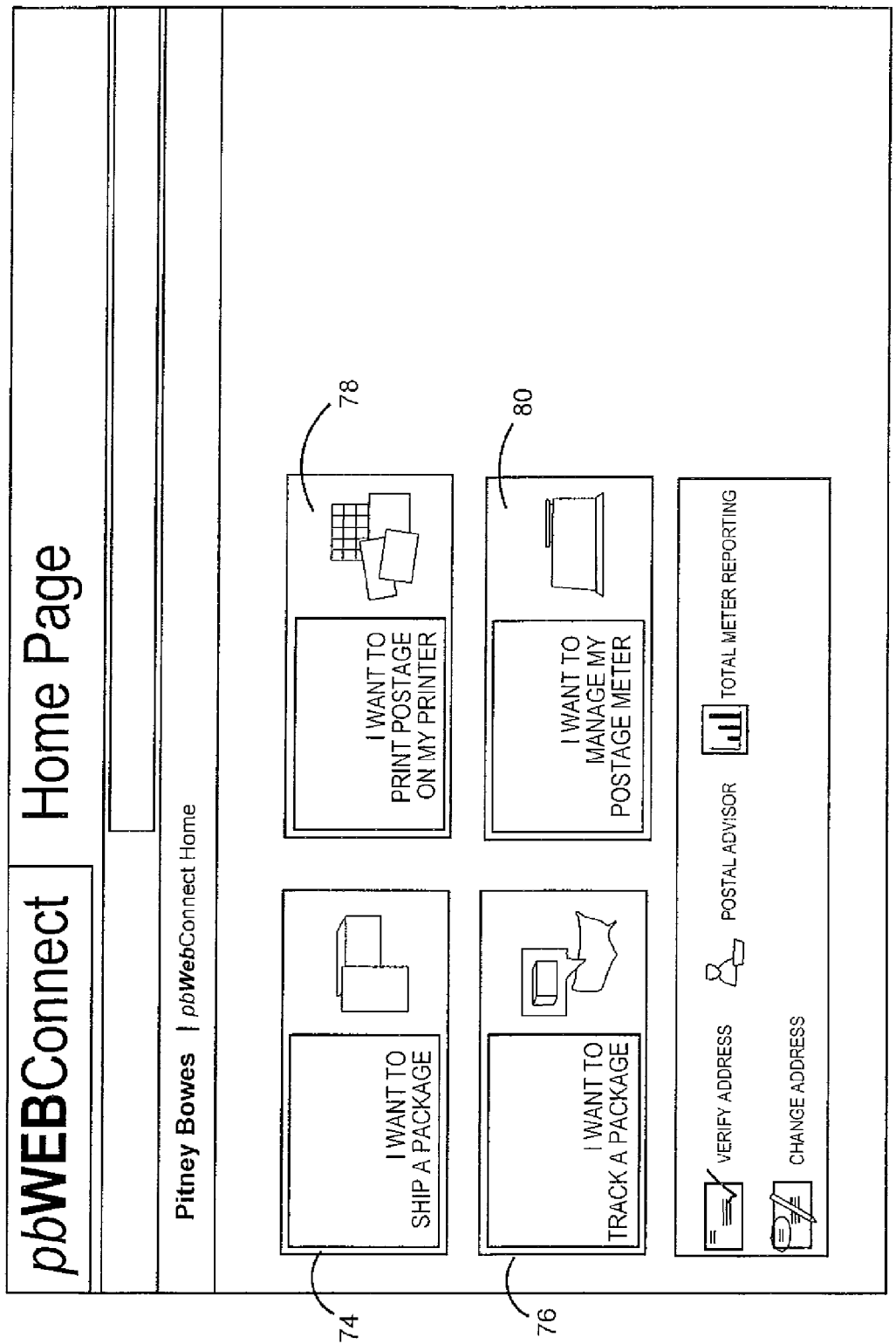

FIG. 4 illustrates in flow diagram form the operation of the system that allows a user operating the PC 16 to interface with the mail processing machine 10. In step 50, a user, using a standard web browser running on an external processing system, e.g., PC 16, accesses a web application hosted by the web server 20 via the network 14, and logs into the user's account. The user account is pre-established by the user, where information is provided that includes, among other things, a user identification, an access password, and the serial numbers of one or more mail processing machines that the user operates and desires to be included in the user's account. FIG. 5 illustrates an example of a log-in screen displayed to the user on the PC 16 by the web application hosted by the web server 20, where the user is asked to input a user name 70 and password 72 to access their account. Upon successful verification of the user name and password, the web application displays a screen to the user, such as illustrated in FIG. 6, to allow the user to select one of several options. As shown therein, the user has several options from which to select, including shipping a package 74, tracking a package 76, printing postage 78 using the printer 18 coupled to the PC 16, and managing 80 a postage meter.

Figure 7:
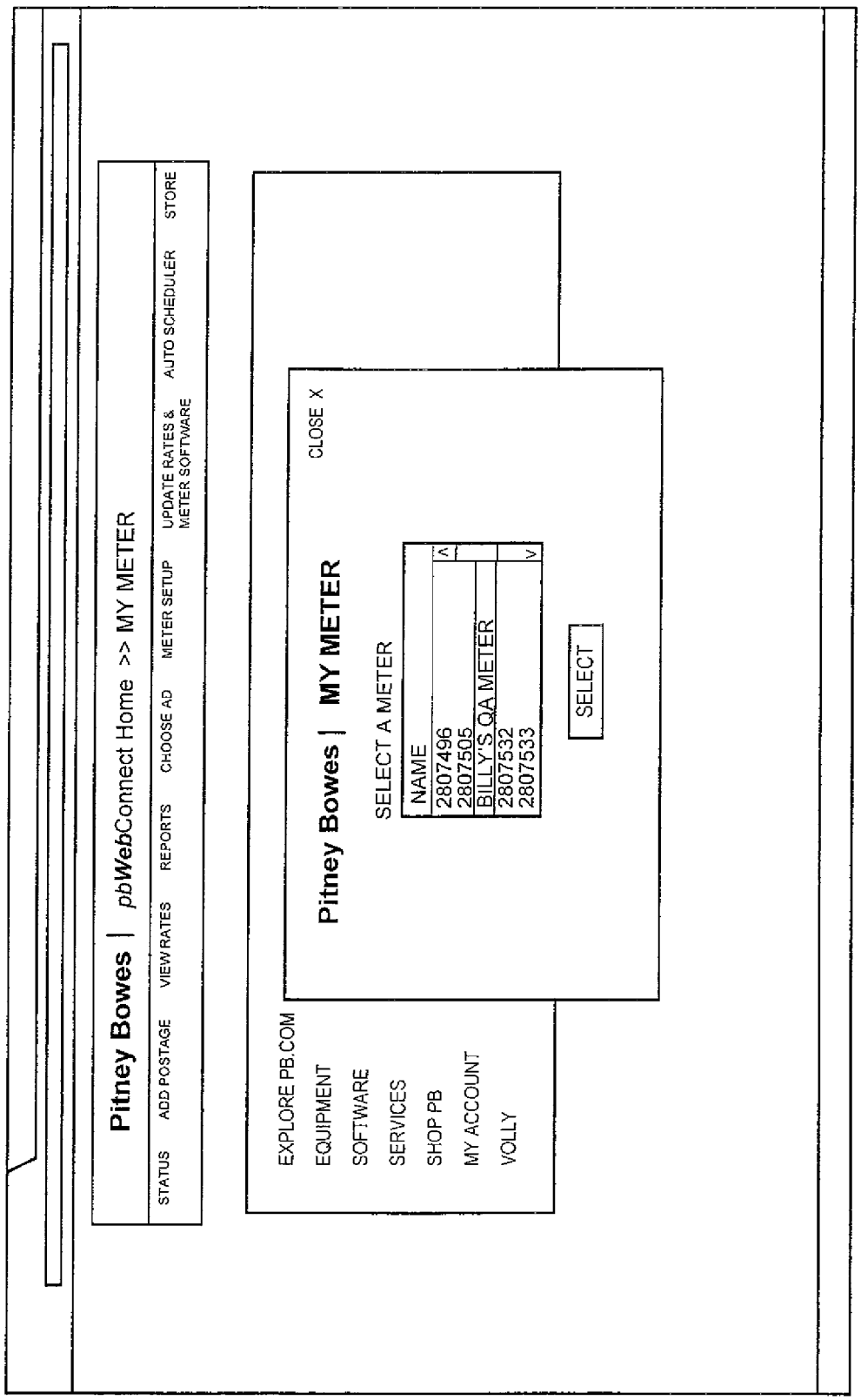
Figure 8:
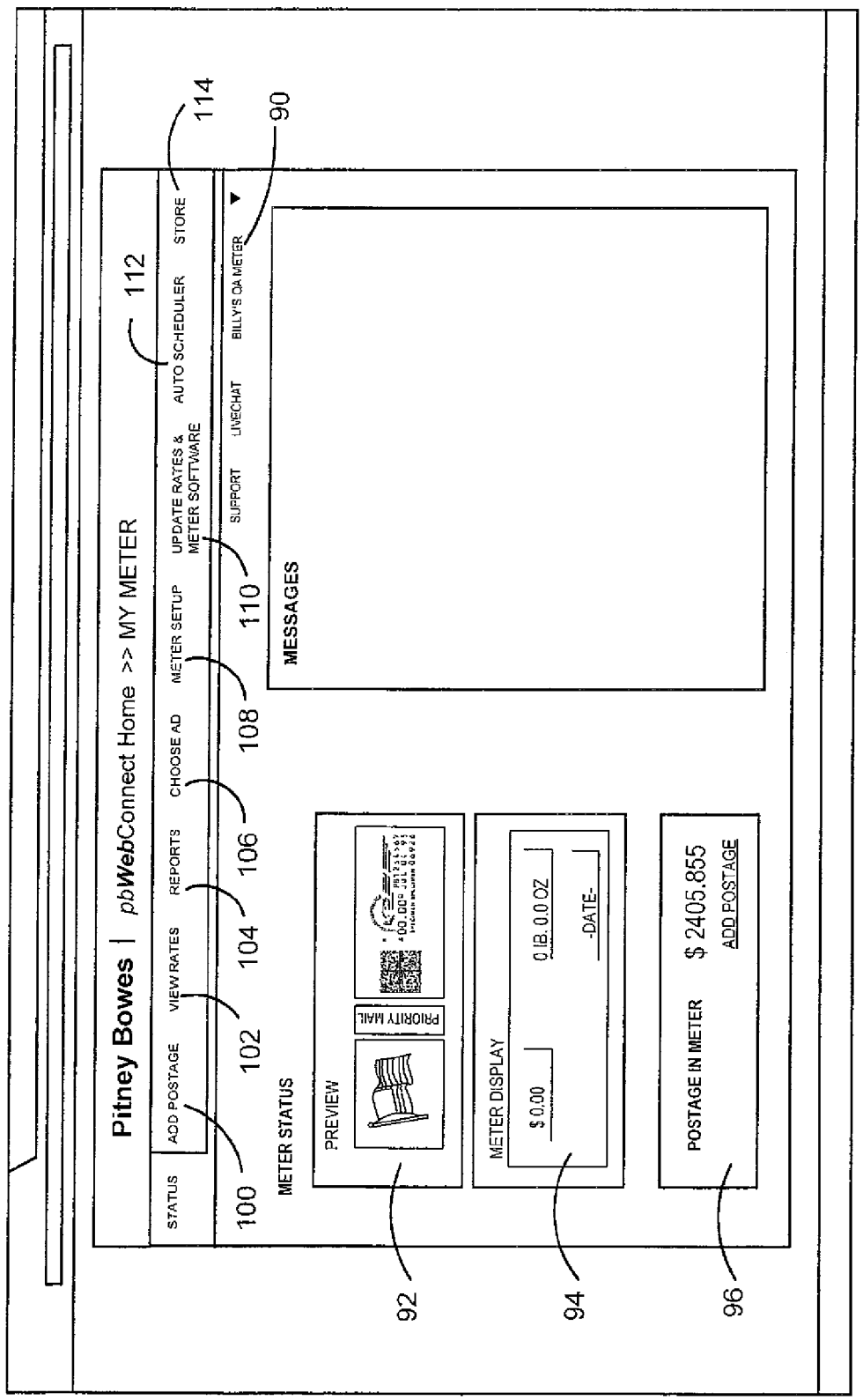

Upon selection of the option 80 to manage a postage meter, the web browser presents a screen, such as illustrated in FIG. 7, that displays to the user all of the postage meters that are associated with the user's account and allows the user to select a specific postage meter, e.g. postage meter 10. Returning to FIG. 4, in step 52, the user selects a serial number, e.g., for the mail processing machine 10, which configures the web application for that specific mail processing machine 10. In lieu of displaying serial numbers, the web application can also display names that have been assigned to serial numbers by the user to make it easier for the user to identify different meters, e.g., Billy's QA Meter. Once a particular postage meter, e.g., mail processing machine 10, identified as Billy's QA Meter, has been selected, the web application will display to the user a screen such as illustrated in FIG. 8 which provides the serial number (or name of the meter) 90, a preview of the current indicium 92 that will be printed by the meter, a copy of the meter display 94, which includes information that is displayed on the actual display of the mail processing machine 10, such as postage amount, weight, and date, and the amount of postage available 96 in the mail processing machine 10. The screen also provides the user with several operations that can be selected to perform on the mail processing machine 10, including, for example, but not limited to, Add Postage 100, View Rates 102, Reports 104, Choose Ad 106, Meter Setup 108, Update Rates & Meter Software 110, Auto Scheduler 112, and Store 114.

Figure 9:
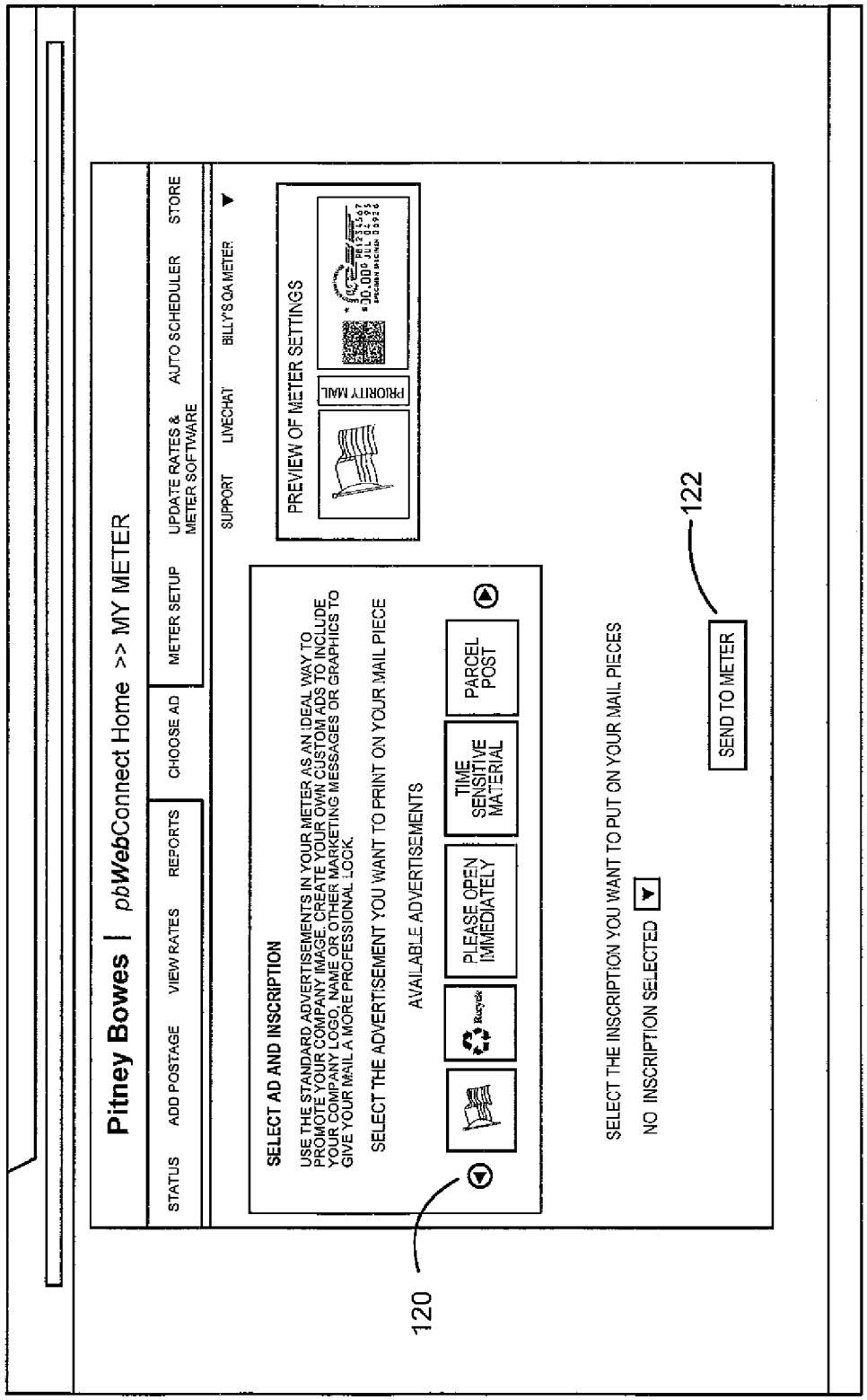

Referring again to FIG. 4, in step 54, the user selects an operation to be performed, and the configuration information, i.e., the identification of the selected mail processing machine 10, is combined with the selected operation. For example if the user selects the operation to Choose Ad 106, the web application will display a screen such as illustrated in FIG. 9. This will allow the user to select an advertisement, from a list of available advertisements 120, that will be printed by the mail processing machine 10 on each envelope being processed by the mail processing machine 10. The user can review and select an advertisement, and then click on the "Send to Meter" button 122. The configuration information, along with the requested operation, is sent from the PC 16 to the web server 20 and added to a queue on the web server 20. In step 56, the mail processing machine 10 polls the web server 20 to check on the availability of any queued messages intended for it. This polling can occur at some predefined interval, such as, for example, every 3 seconds. Of course, the polling interval can be set to any desired time interval.

The mail processing machine 10 polls the web server 20 by sending a HTTP request, which is transformed into Ethernet packets by the mail processing machine's network stack using the network parameters retrieved from the network connectivity device 12 (obtained and stored as described with respect to FIG. 3). These Ethernet packets are then transmitted to the network connectivity device 12 via the USB connection (USB Interface B 32) and sent over the network 14

(using either USB Interface A 26 if a wireless connection or Ethernet interface 30 if a wired connection). In certain embodiments, the network connectivity device 12 does not perform any parsing/interpretation of the packets it receives from the mail processing machine 10. And likewise, except for filtering all incoming packets to ensure that it forwards only packets intended for the mail processing machine 10, it does not perform any parsing/interpretation of packets received from the network 14 before it passes the data to the mail processing machine 10. In other embodiments, the network connectivity device 12 can perform parsing and reformatting of packets into other formats if desired.

When this request is received by the web server 20, in step 58 the web server 20 responds with any pending messages in the queue for the mail processing machine 10. In step 60, the network connectivity device 12 receives this response from the network 14 and forwards the response to the mail processing machine 10 via the USB connection. In step 62, the received packets are processed by mail processing machine's 10 network stack and passed to appropriate components in the mail processing machine 10 for data consumption. Thus, in the example above where the user desired to change the advertisement, the mail processing machine 10 will act upon the received message to change the advertisement that is printed on each mail piece processed by the mail processing machine 10. In step 64, the network stack of the mail processing machine 10 forms a return response message, indicating the status of the requested operation, e.g., completed, unable to be completed due to an error, or other suitable message, that is sent to the network connectivity device 12 and returned to the web server 20 via the network 14. The web server 20 can then update the web application running on the PC 16 to provide the user with the status of the requested operation.

Using the network connectivity for outside world communication activities, such as downloading software updates, checking funds availability and adding funds to registers maintained within the mail processing machine 10, and to upload customer data obtained by the mail processing machine 10 the a data center, e.g., server 20, provides the user with a better user experience as conventional communications for these types of activities required the use of a modem to connect the mail processing machine to the data center and use of the display provided on the mail processing machine to input/output information, which severely limited the amount and type of information available to the user. Thus, a user is able to directly interface with the mail processing machine 10 using an external processor system, e.g., PC 16, utilizing only a standard web browser. No additional software is required to be installed on the external processor system, making such interfacing able to occur independent of the user's hardware configuration. Furthermore, by using the web server/browser approach of the present invention, it is possible for more than one external processing device, e.g., PC 16, to access the mail processing machine 10 at the same time. This is different than standard USB servers which allow only one computer to access a device at any time. Furthermore, the hosted web application can communicate with multiple network connection devices simultaneously.

To add security to messages being sent over the network 14 between the mail processing machine 10 and web server, preferably HTTPS (HTTP with SSL—secure connection) is used to communicate with the web server 20. In addition, messages being sent from the mail processing machine 10 preferably include unique identification information, generated using data that is present in the mail processing machine 10, that allows the web server 20 to authenticate the mail processing machine 10 and make certain that the web server 20 is communicating with an authentic mail processing machine 10.

Thus, the network connectivity device 12, when coupled to a mail processing machine 10, enables a cloud application running on PC 16 to interface with the mail processing machine 10 without requiring any software to be installed on the PC 16 other than a standard web browser. It should be understood that while the above description relates to a mail processing machine, the present invention is not so limited and can be utilized with any type of peripheral device, such as, for example, a scale, a printer, a scanner or the like. Additionally, the network connectivity device 12 can be coupled to a plurality of different types of peripheral devices simultaneously to provide each of the plurality of peripheral devices with access to the network, or the capability to communicate with each other through the network connectivity device. In the case where a peripheral device does not include a network stack for preparing network messages, the network connectivity device 12 can include the necessary software for such operation, thereby allowing such "dumb" devices to be accessible and controlled using a processing device via a network similarly as described above.

While preferred embodiments of the invention have been described and illustrated above, it should be understood that they are exemplary of the invention and are not to be considered as limiting. Additions, deletions, substitutions, and other modifications can be made without departing from the spirit or scope of the present invention. Accordingly, the invention is not to be considered as limited by the foregoing description but is only limited by the scope of the appended claims.

What is claimed is:

1. A method for controlling a mail processing machine using an external processing device comprising:

providing to the external processing device, by a web server, access to a web application hosted by the web server via a web browser operating on the external processing device;

receiving, by the web server from the external processing device, an operation request for an operation to be performed by the mail processing machine;

storing, by the web server, a message including the operation request and an identification of the mail processing machine in a queue;

receiving, by the web server via the network, a request from a network connectivity device coupled to a USB slave port of the mail processing machine and the network for any messages intended for the mail processing machine that are stored in the queue;

providing, by the web server, the message stored in the queue to the network connectivity device;

sending, by the network connectivity device, the message to the mail processing machine; and processing, by the mail processing machine, the message to perform the operation.

2. The method of claim 1, wherein providing, by the web server, access to a web application hosted by the web server to the external processing device further comprises:

providing a log-in screen to the external processing device to log into a user account;

receiving, from the external processing device, a user name and password;

verifying, by the web server, the user name and password; and providing, by the web server, a list of at least one mail processing machine associated with the user's account.

3. The method of claim 2, further comprising:
receiving, by the web server, an identification of the mail processing machine for which an operation is desired to be performed; and
configuring, by the web server, the web application for the identified mail processing machine.

4. The method of claim 1, wherein the identification of the mail processing machine includes a serial number.

5. The method of claim 1, wherein the web application includes a plurality of operations that can be performed by the mail processing machine.

6. The method of claim 1, wherein the web application includes a copy of at least a portion a display currently being displayed on the mail processing machine.

7. The method of claim 6, where at least a portion of a display currently being displayed on the mail processing machine includes a postage amount and date.

8. The method of claim 1, wherein the message is sent from the web server to the network connectivity device using a secure connection.

9. The method of claim 1, wherein the mail processing machine includes one of a scale, printer or scanner.

10. The method of claim 1, wherein the external processing device is a personal computer.

11. The method of claim 1, wherein the external processing device is a hand-held device.

12. A system comprising:
a mail processing machine;
a network connectivity device coupled to the mail processing machine via a USB slave port on the mail processing machine, the network connectivity device being further coupled to a network;
a processing device coupled to the network; and
a web server coupled to the network,
wherein the processing device controls operation of the mail processing machine using a web application hosted by the web server, the web server being configured to provide to the processing device access to a web application hosted by the web server via a web browser operating on the processing device; receive from the processing device an operation request for an operation to be performed by the mail processing machine; store a message including the operation request and an identification of the mail processing machine in a queue; and in response to receiving a request from the network connectivity device for any messages intended for the mail processing machine that are stored in the queue, provide the message stored in the queue to the network connectivity device; wherein the network connectivity device is configured to send the message to the mail processing machine and the mail processing machine is configured to process the message and perform the operation.

13. The system of claim 12, wherein the mail processing machine includes one of a scale, a printer or a scanner.

14. The system of claim 12, wherein the processing device is a personal computer.

15. The system of claim 12, wherein the processing device is a hand-held device.

16. The system of claim 12, further comprising a plurality of mail processing machines, wherein the network connectivity device is coupled to each of the plurality of mail processing machines.

* * * * *